US011667545B2

(12) United States Patent
Yu et al.

(10) Patent No.: US 11,667,545 B2
(45) Date of Patent: Jun. 6, 2023

(54) NEGATIVE OXYGEN ION WATER BATH APPARATUS

(71) Applicant: Guangzhou Shengji Technology Co., Ltd., Guangzhou (CN)

(72) Inventors: Yong Yu, Lenox, MA (US); Mengchun Yu, Lenox, MA (US)

(73) Assignee: GUANGZHOU SHENGJI TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/536,457

(22) Filed: Nov. 29, 2021

(65) Prior Publication Data
US 2023/0036758 A1 Feb. 2, 2023

(30) Foreign Application Priority Data

Jul. 27, 2021 (CN) .......................... 2021108535654

(51) Int. Cl.
*B01D 53/02* (2006.01)
*C02F 1/20* (2023.01)
*C02F 1/72* (2023.01)

(52) U.S. Cl.
CPC ................ *C02F 1/20* (2013.01); *B01D 53/02* (2013.01); *C02F 1/727* (2013.01); *B01D 2253/102* (2013.01); *B01D 2256/12* (2013.01); *B01D 2257/106* (2013.01)

(58) Field of Classification Search
CPC ................ B01D 53/02; B01D 2256/12; B01D 2253/102; B01D 2257/106; C02F 1/727; C02F 1/20; C02F 1/008; A61H 33/0095; A61H 33/02; A61H 33/027
See application file for complete search history.

(56) References Cited

FOREIGN PATENT DOCUMENTS

| CN | 101660360 | A | | 3/2010 |
|----|-----------|---|---|--------|
| CN | 103271694 | A | | 9/2013 |
| CN | 203302952 | U | | 11/2013 |
| CN | 204225209 | U | * | 3/2015 |
| CN | 204225209 | U | | 3/2015 |
| CN | 207477431 | U | | 6/2018 |
| CN | 208777382 | U | | 4/2019 |
| CN | 115371180 | A | * | 11/2022 |

* cited by examiner

*Primary Examiner* — Sharon Pregler
(74) *Attorney, Agent, or Firm* — Dinsmore & Shohl LLP

(57) ABSTRACT

The present disclosure discloses an NOI water bath apparatus, which includes an NOI generator, a GLM and a GLS, where the NOI generator includes an ionization module, and the ionization module is configured to ionize oxygen into NOIs; an air inlet end of the GLM is connected to an air outlet end of the NOI generator, the GLM includes a gas-liquid mixing module, and the gas-liquid mixing module is configured to dissolve the NOIs generated by the ionization module; a liquid inlet end of the GLS is connected to a liquid outlet end of the GLM, the GLS includes a first filtering module, and the first filtering module is configured to filter out exhaust gas in the gas-liquid mixing module.

10 Claims, 7 Drawing Sheets

NEGATIVE OXYGEN ION WATER BATH APPARATUS

CROSS-REFERENCE TO RELATED APPLICATION

This application claims priority to Chinese application number 2021108535654 filed Jul. 27, 2021, the disclosure of which is hereby incorporated by reference in its entirety.

FIELD OF THE INVENTION

The present disclosure relates to the field of water bath technologies, and in particular, to a negative oxygen ion (NOI) water bath apparatus.

BACKGROUND OF THE INVENTION

Some products and solutions with NOIs generation, such as air purifiers, shower health rooms and bathtubs, have appeared one after another based on the basic principle that NOIs have a health care effect on human body. For example, Chinese patent No. 200810119010.1 discloses a high-performance NOI shower room capable of implementing cell regeneration and aging resistance; Chinese patent No. 201720051204.7 discloses a NOI massage bathtub; Chinese patent No. 201310246074.9 discloses an NOI body dryer; Chinese patent No. 201320375893.9 discloses a constant-temperature bathtub with an NOI generator; Chinese patent No. 201420354863.4 discloses a bathtub system capable of generating highly active NOIs; and Chinese patent No. 201820727945.7 discloses an NOI shower head. In the above-mentioned disclosures, NOI related technologies are introduced to sanitary-related products based on the principle that NOIs have beneficial effects on human body.

Existing devices and apparatuses related to NOI bathing have created a liquid environment for human body to better absorb NOIs, but an NOI generator generates super oxygen (ozone) while ionizing to generate NOIs. When the concentration of the super oxygen reaches a certain level, the super oxygen causes damage to a user's lungs. Therefore, there is an urgent need to improve devices and apparatuses related to NOI bathing to improve the safety of a bathing apparatus.

SUMMARY OF THE INVENTION

In view of the disadvantages existing in prior art, an objective of the present disclosure is to provide an NOI water bath apparatus which can remove excess super oxygen in water and improve safety during use.

According to the present disclosure, an NOI water bath apparatus is provided, including an NOI generator, a gas-liquid mixer (GLM) and a gas-liquid separator (GLS); the NOI generator includes an ionization module, and the ionization module is configured to ionize oxygen into NOIs; an air inlet end of the GLM is connected to an air outlet end of the NOI generator, the GLM includes a gas-liquid mixing module, and the gas-liquid mixing module is configured to dissolve the NOIs generated by the ionization module; and a liquid inlet end of the GLS is connected to a liquid outlet end of the GLM, the GLS includes a first filtering module, and the first filtering module is configured to filter out exhaust gas in the gas-liquid mixing module.

The NOI water bath apparatus according to the present disclosure filters out exhaust gas in the GLM, such as oxygen and super oxygen, through the GLS, prevents an excessive super oxygen concentration from causing damage to a user's lungs, and improves safety during use.

In some implementations, the liquid inlet end of the GLS is connected to the liquid outlet end of the GLM through a circulating pump, a liquid outlet end of the GLS is divided into a first water channel and a second water channel, and the first water channel is connected to the GLM for backflow. Therefore, after a mixed liquid flowing out from the circulating pump is filtered by the GLS, the mixed liquid flows back to the GLM before being output from a device, so as to adjust the concentration of NOIs in the water to achieve an optimal mixing effect.

In some implementations, the first water channel is provided with a first control switch. Therefore, the first water channel can be opened or closed through the first control switch for backflow.

In some implementations, the NOI water bath apparatus further includes an activated carbon filter, where an air inlet end of the activated carbon filter is connected to an air outlet end of the GLS and an air outlet end of the GLM; and the activated carbon filter includes a second filtering module, and the second filtering module is configured to treat super oxygen discharged from the air outlet end of the GLS and the air outlet end of the GLM. Therefore, the super oxygen discharged from the air outlet end of the GLS and the air outlet end of the GLM is treated to prevent the discharged super oxygen from being dissolved into the water again or directly discharged to cause harm to the human body.

In some implementations, the NOI water bath apparatus further includes a filter, where an air inlet end of the filter is connected to the NOI generator, and an air outlet end of the filter is connected to the air inlet end of the GLM; and the filter includes a third filtering module, and the third filtering module is configured to filter out impurities formed by oxidation by oxygen ions. Therefore, the filter filters out by-product carboxylic acid formed by other gas (such as nitrogen and hydrogen) impurities under strong oxidation by oxygen ions.

In some implementations, the air inlet end of the filter is connected to the air outlet end of the NOI generator through a second control switch, a waste material end of the NOI generator is connected to a third control switch, and a first liquid level sensor is arranged in the third filtering module. Therefore, the second control switch is configured to control the connection or disconnection between the NOI generator and the filter, the third control switch is configured to control the connection or disconnection between the filter and the outside, and the first liquid level sensor is configured to detect the capacity of internal impurities. When necessary, the impurities such as carboxylic acid in the filter can be discharged through the third control switch.

In some implementations, the NOI water bath apparatus further includes a cooling water apparatus, where the cooling water apparatus is arranged inside or outside the NOI generator; the cooling water apparatus includes a cooling module, and the cooling module is configured to cool the ionization module. Therefore, the cooling water apparatus can cool the NOI generator to ensure that the NOI generator operates normally.

In some implementations, a water inlet end of the cooling water apparatus is connected to a front half of a water inlet pipe of the GLM through a cooling water pump, and a water outlet end of the cooling water apparatus is connected to a rear half of the water inlet pipe of the GLM. Therefore, during use, the NOI generator can be cooled while water is supplied to the GLM.

In some implementations, the NOI water bath apparatus further includes an oxygen purification apparatus, where an air outlet end of the oxygen purification apparatus is connected to the NOI generator through a fourth control switch; the air outlet end of the oxygen purification apparatus is provided with a barometer; the oxygen purification apparatus includes an oxygen supply module, and the oxygen supply module is configured to purify oxygen. Therefore, the oxygen purification apparatus provides high-purity oxygen to the NOI generator, and the fourth control switch is configured to control the connection or disconnection between the oxygen purification apparatus and the NOI generator.

In some implementations, a water inlet end of the GLM is connected to a water inlet pipe through a fifth control switch, and at least one of a second liquid level sensor, an NOI concentration sensor and a temperature sensor is arranged in the GLM. Therefore, the fifth control switch is configured to control the connection or disconnection between the GLM and the water inlet pipe. The NOI concentration sensor is configured to detect the concentration of NOIs inside the GLM, and configured to cooperate in adjusting the concentration of NOIs in the water, so as to achieve the optimal mixing effect. The temperature sensor is configured to detect the internal temperature. The second liquid level sensor is configured to detect the internal liquid level.

Compared with the prior art, an NOI generating apparatus for a water bath according to the present disclosure dissolves NOIs with an ultra-high concentration in water through exhaust gas filtration and backflow, to create a liquid environment with high-concentration NOIs that are easily absorbed by skin, which is the largest organ of human body, so that the oxygen that can be absorbed by the human body is many orders of magnitude higher than that absorbed using other methods. The method is a good oxygen supplement method.

Figure 1:
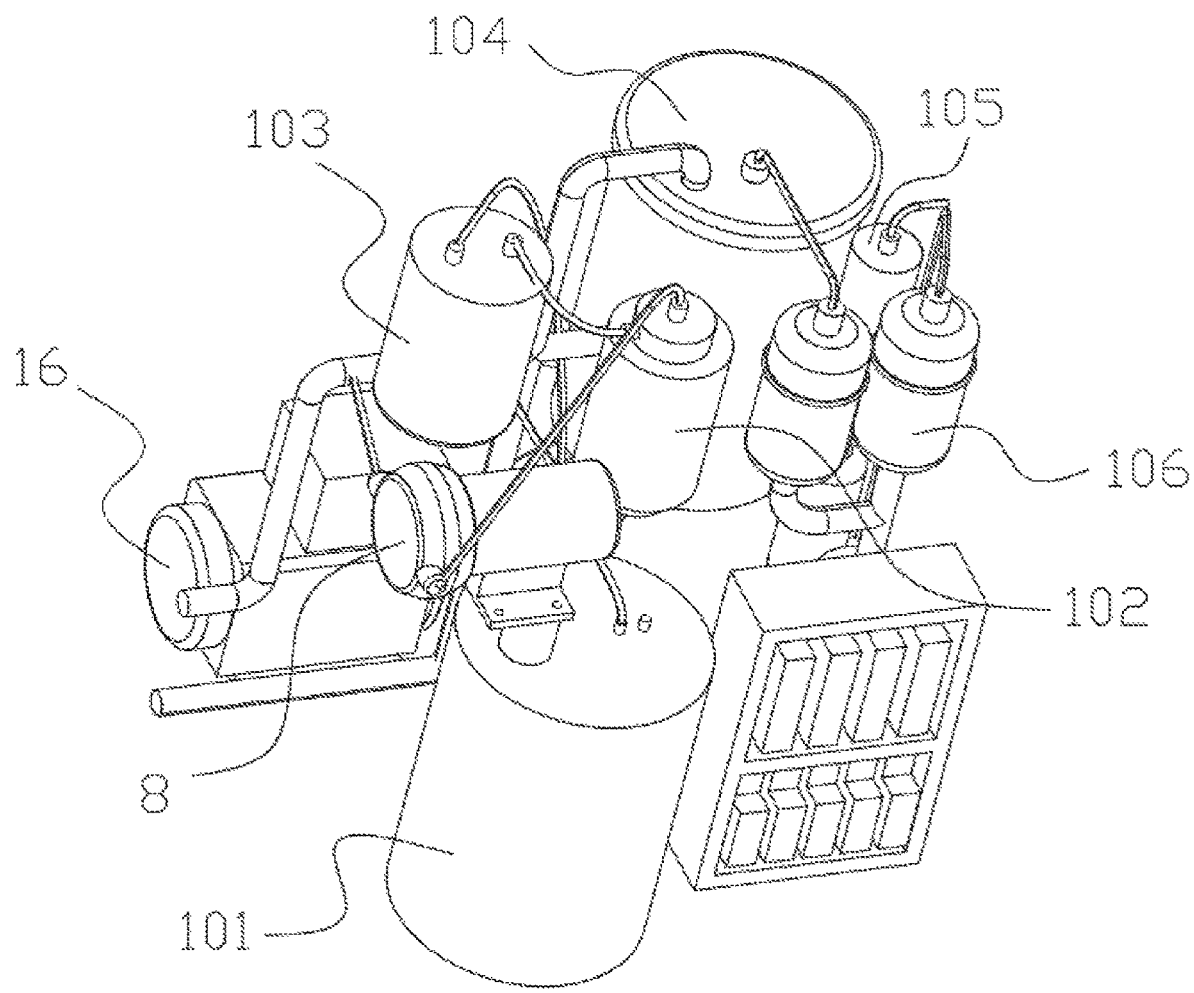
FIG. 1 is a schematic diagram of an NOI water bath apparatus according to an implementation of the present disclosure.
Figure 2:
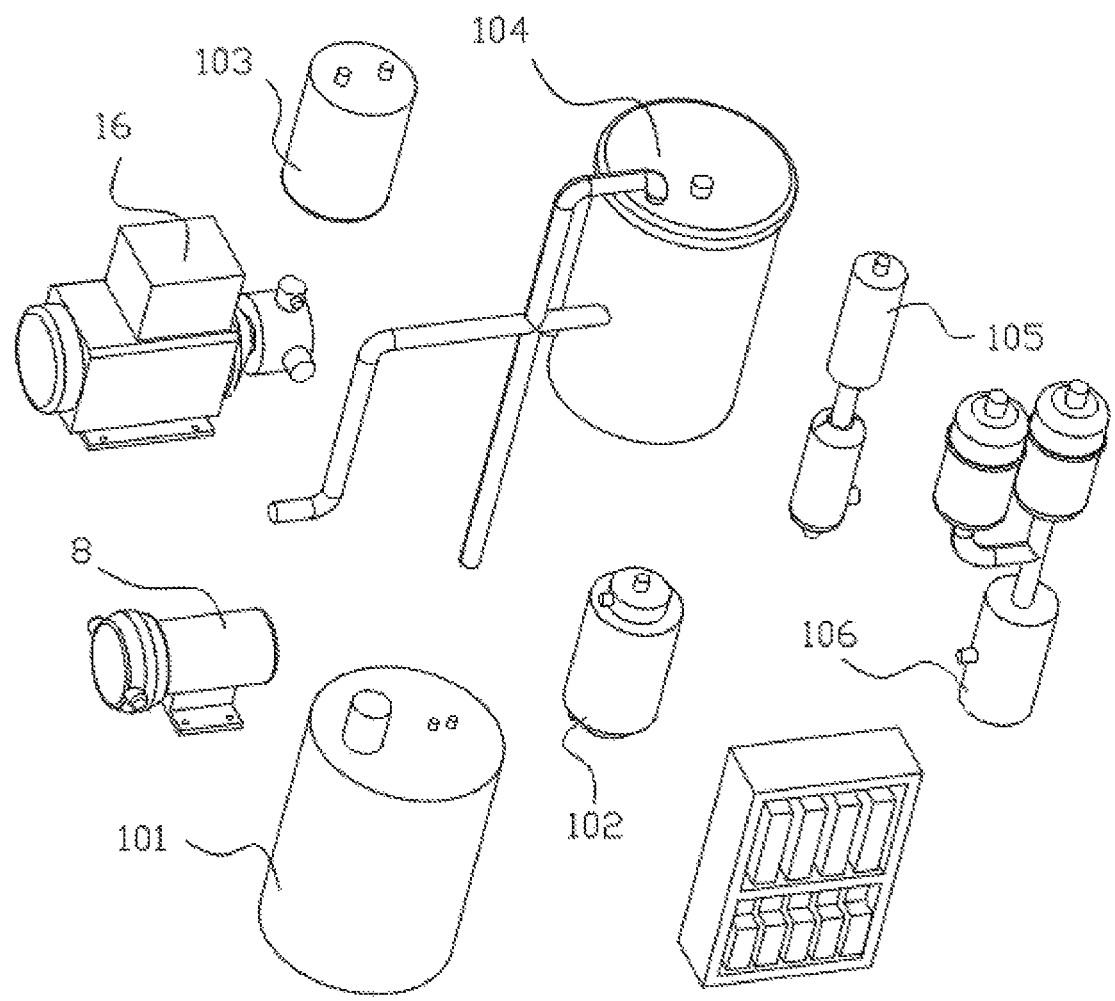
FIG. 2 is an exploded view of an NOI water bath apparatus according to an implementation of the present disclosure.
Figure 3:
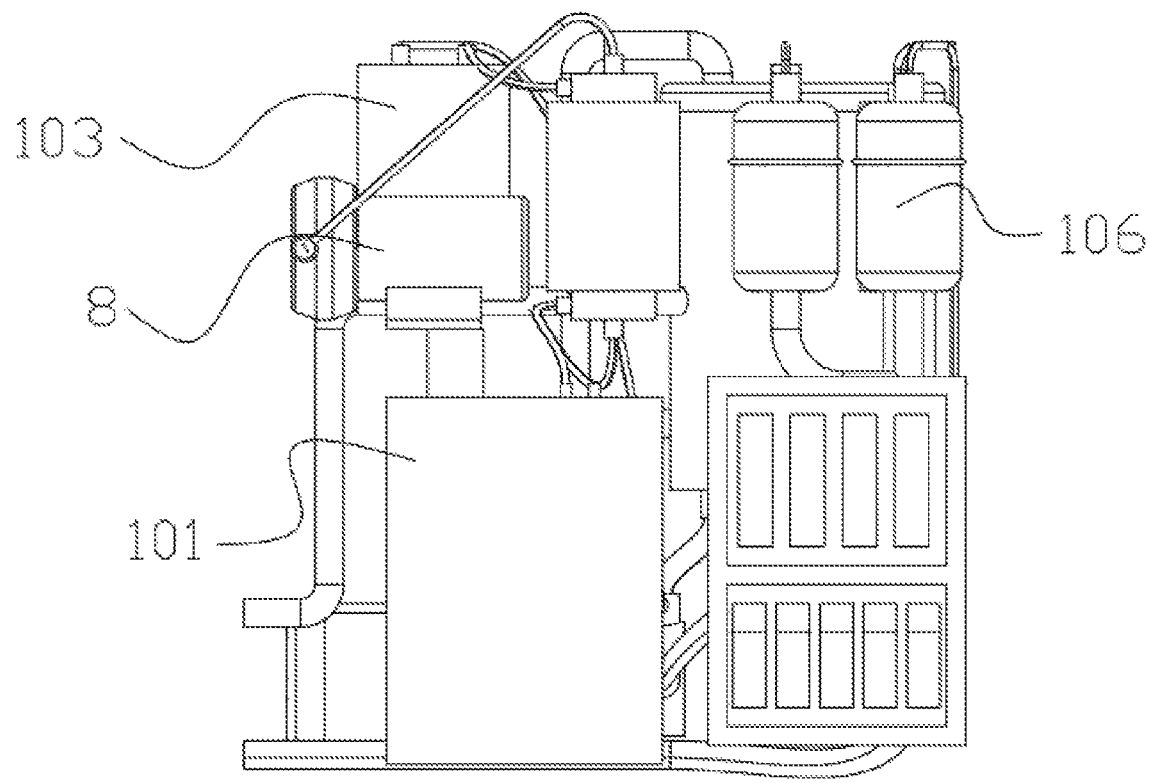
FIG. 3 is a front view of an NOI water bath apparatus according to an implementation of the present disclosure.
Figure 4:
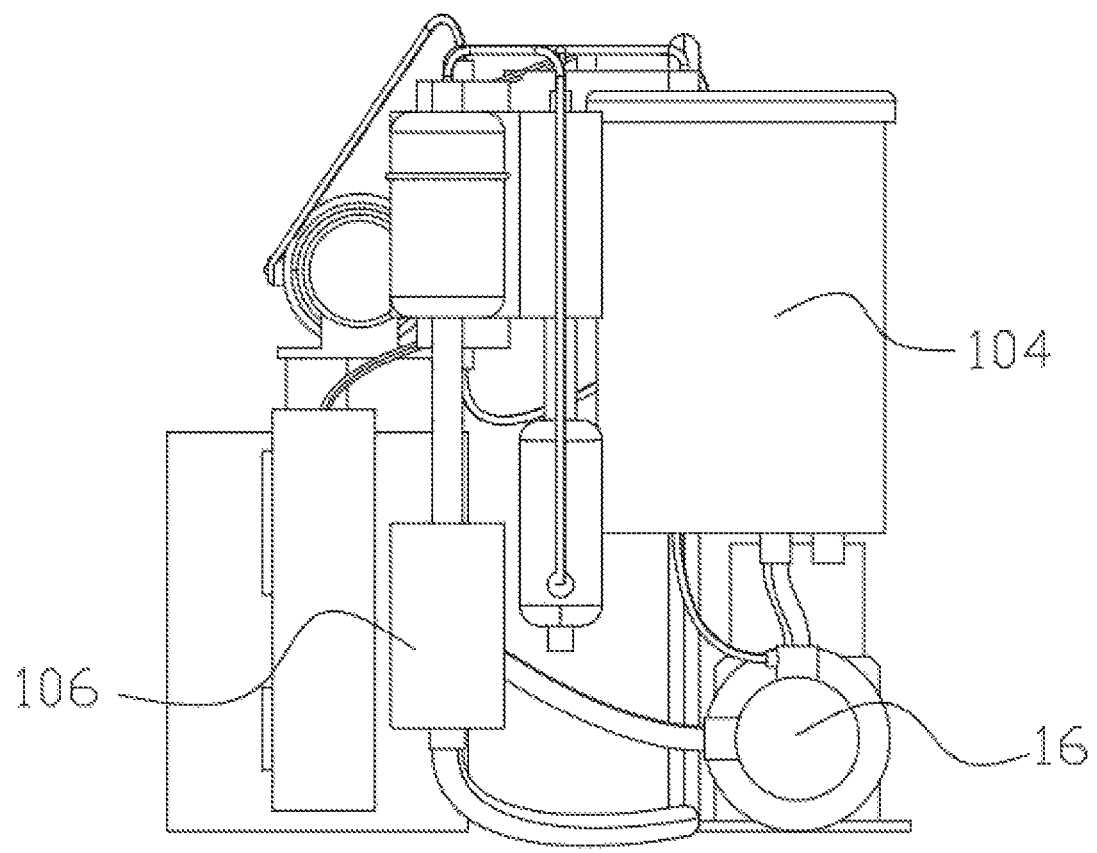
FIG. 4 is a right view of an NOI water bath apparatus according to an implementation of the present disclosure.
Figure 5:
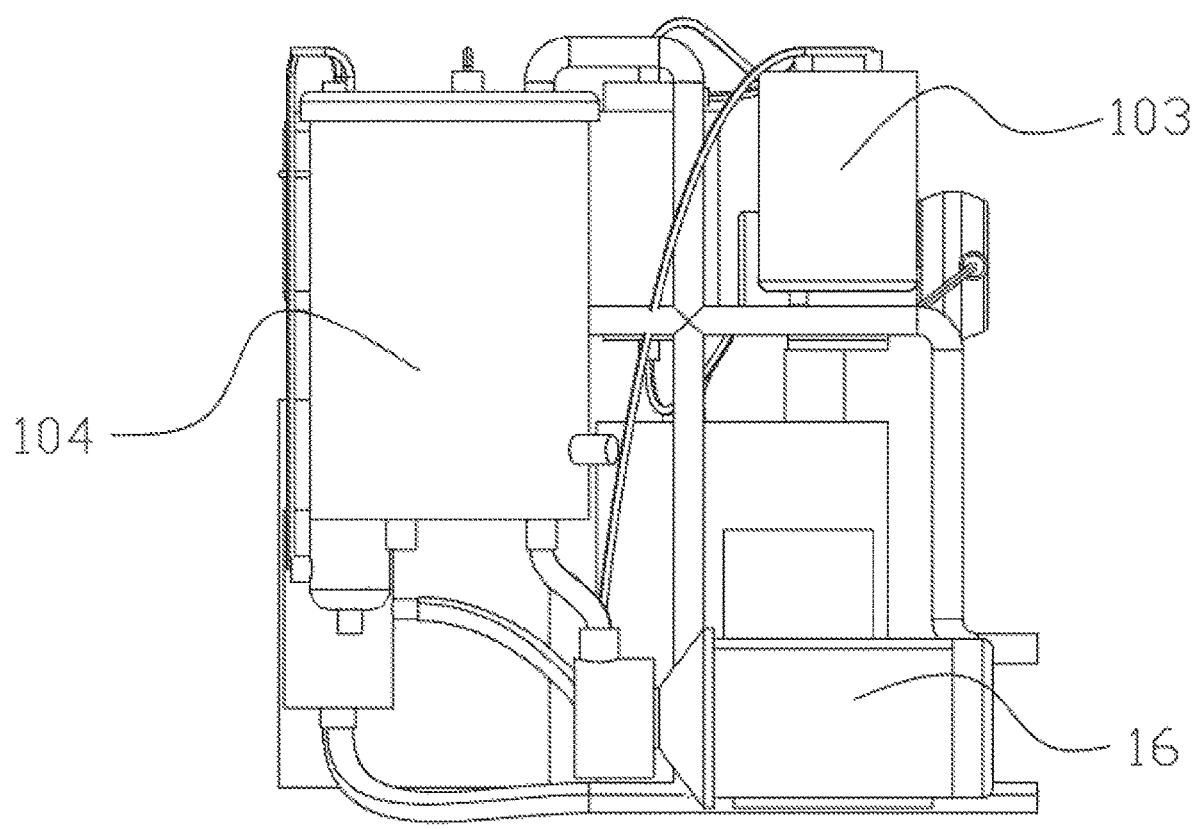
FIG. 5 is a rear view of an NOI water bath apparatus according to an implementation of the present disclosure.
Figure 6:
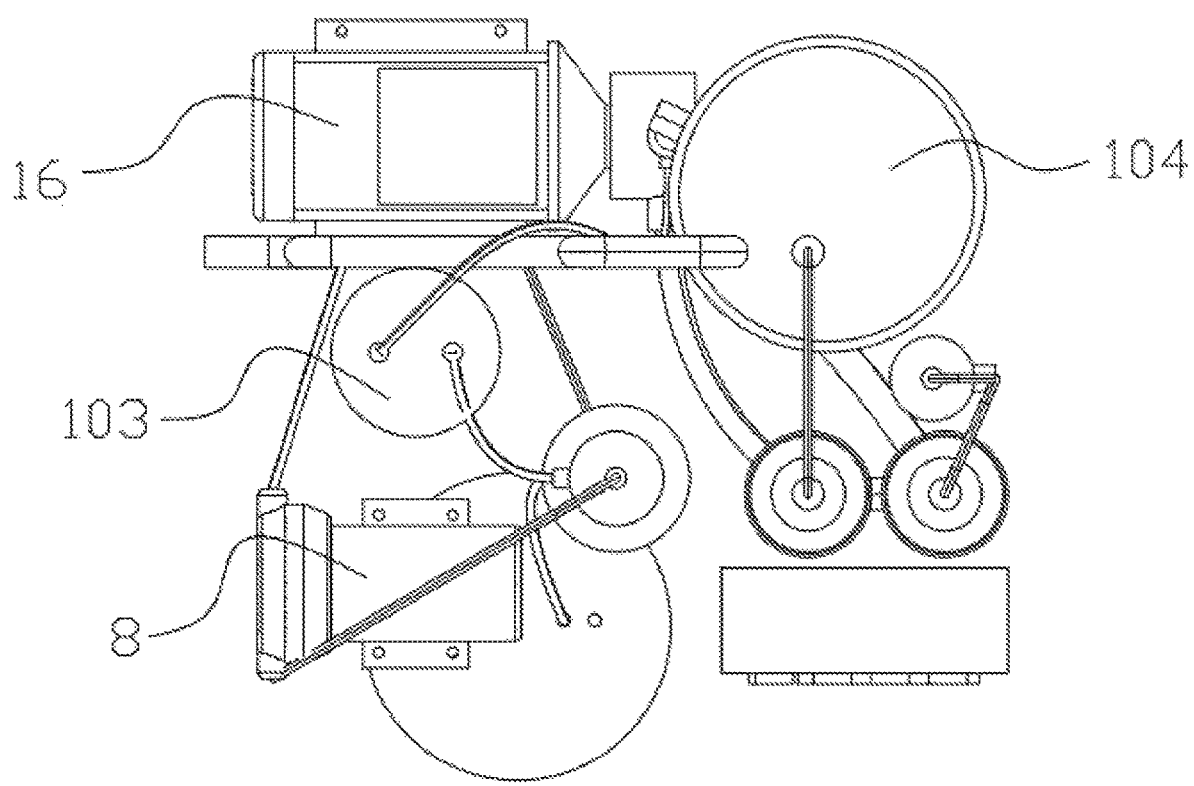
FIG. 6 is a top view of an NOI water bath apparatus according to an implementation of the present disclosure.

Description of reference numerals of the accompanying drawings: oxygen supply module 1, ionization module 2, gas-liquid mixing module 3, first filtering module 4, second filtering module 5, third filtering module 6, fourth control switch 7, cooling water pump 8, second control switch 9, third control switch 10, first liquid level sensor 11, fifth control switch 12, second liquid level sensor 13, NOI concentration sensor 14, temperature sensor 15, circulating pump 16, first water channel 17, second water channel 18, first control switch 19, oxygen purification apparatus 101, NOI generator 102, filter 103, GLM 104, GLS 105, and activated carbon filter 106.

DETAILED DESCRIPTION OF THE INVENTION

The present disclosure is further described in detail below with reference to accompanying drawings.

FIG. 1 to FIG. 6 schematically illustrate an NOI water bath apparatus according to an implementation of the present disclosure. As shown in FIG. 1 to FIG. 6, the apparatus includes an oxygen purification apparatus 101, an NOI generator 102, a cooling water apparatus (not shown), a filter 103, a GLM 104, a GLS 105 and an activated carbon filter 106; the oxygen purification apparatus 101 includes an oxygen supply module, and the oxygen supply module is configured to purify oxygen and provide high-purity oxygen to the NOI generator 102; an air inlet end of the NOI generator 102 is connected to an air outlet end of the oxygen purification apparatus 101, the NOI generator 102 includes an ionization module, and the ionization module is configured to crack and ionize oxygen into NOIs; the cooling water apparatus (not shown) is arranged inside the NOI generator 102, the cooling water apparatus includes a cooling module, and the cooling module is configured to cool the NOI generator 102 to ensure that the NOI generator 102 operates normally; an air inlet end of the filter 103 is connected to an air outlet end of the NOI generator 102, the filter 103 includes a third filtering module, and the third filtering module is configured to filter out by-product carboxylic acid formed by other gas (such as nitrogen and hydrogen) impurities in the ionization process of the NOI generator 102 under strong oxidation by oxygen ions, as well as impurities formed by trace non-oxygen substances output by the oxygen purification apparatus 101 and oxidized by oxygen ions; an air inlet end of the GLM 104 is connected to an air outlet end of the filter 103, the GLM 104 includes a gas-liquid mixing module, and the gas-liquid mixing module is configured to dissolve NOIs generated by the NOI generator 102; a liquid inlet end of the GLS 105 is connected to a liquid outlet end of the GLM 104, the GLS 105 includes a first filtering module, and the first filtering module is configured to filter out exhaust gas in the GLM 104; and an air inlet end of the activated carbon filter 106 is connected to an air outlet end of the GLS 105, the activated carbon filter 106 includes a second filtering module, and the second filtering module is configured to treat super oxygen discharged from the GLS 105 and the GLM 104.

In the NOI water bath apparatus according to the present disclosure, the oxygen purification apparatus 101 provides high-purity oxygen to the NOI generator 102, increases the concentration of NOIs ionized by the NOI generator 102, and can further reduce the quantity of by-product carboxylic acid formed by the NOIs. The filter 103 removes the by-product carboxylic acid, and the GLS 105 removes exhaust gas in the GLM 104, such as oxygen and super oxygen, to prevent an excessive super oxygen concentration from causing damage to a user's lungs and improve safety during use. Generally, the super oxygen causes damage to the user's lungs when reaching 60 ppm.

The air outlet end of the oxygen purification apparatus 101 is connected to the NOI generator 102 through a fourth control switch; and the air outlet end of the oxygen purification apparatus 101 is provided with a barometer. Therefore, the fourth control switch is configured to control the connection and disconnection between the oxygen purification apparatus 101 and the NOI generator 102, and the barometer is configured to detect the air pressure of the oxygen purification apparatus 101. The oxygen purification apparatus 101 may be an oxygen purification machine or device, and the fourth control switch 7 may be a valve, such as a solenoid valve.

The NOI generator 102 may be a machine, apparatus or device capable of generating NOIs.

The cooling water apparatus is arranged inside the NOI generator 102, or certainly, may be arranged outside. In this implementation, arranging the cooling water apparatus inside is taken as an example. A water inlet end of the cooling water apparatus is connected to a front half of a water inlet pipe of the GLM 104 through a cooling water pump 8, and a water outlet end of the cooling water apparatus is connected to a rear half of the water inlet pipe of the GLM 104. Therefore, during use, the NOI generator 102 can be cooled while water is supplied to the GLM 104. The cooling water apparatus may be an apparatus used for water cooling, such as a cooling water pipe.

The air inlet end of the filter 103 is connected to the air outlet end of the NOI generator 102 through a second control switch, and the air outlet end of the filter 103 is connected to the air inlet end or the liquid inlet end of the GLM 104 (herein, the air inlet end of the GLM 104 may be the liquid outlet end of the gas-liquid mixing module 3, i.e., the gas-liquid mixing is performed at the liquid outlet end, or the air inlet end may be the air inlet end of the GLM 104 arranged at another part), a waste material end of the filter 103 is connected to a third control switch, and a first liquid level sensor is arranged in the filter 103. Therefore, the second control switch is configured to control the connection or disconnection between the NOI generator 102 and the filter 103, the third control switch is configured to control the connection or disconnection between the filter 103 and the outside, and the first liquid level sensor is configured to detect the capacity of internal impurities. When necessary, the impurities such as carboxylic acid in the filter 103 can be discharged through the third control switch. The filter 103 may be a filter formed by an empty container, the air inlet and air outlet end thereof are arranged at the top of the container, and the waste material end thereof is arranged at the bottom of the container. Certainly, the filter may alternatively be any filter that can filter out carboxylic acid. The second control switch and the third control switch each may be a valve, such as a solenoid valve.

A water inlet end of the GLM 104 is connected to the water inlet pipe through a fifth control switch, and a second liquid level sensor, an NOI concentration sensor and a temperature sensor are arranged in the GLM 104. Therefore, the fifth control switch is configured to control the connection and disconnection between the GLM 104 and the water inlet pipe, the second liquid level sensor is configured to detect the internal liquid level, the NOI concentration sensor is configured to detect the concentration of NOIs inside the GLM 104, and the temperature sensor is configured to detect the internal temperature. The GLM 104 is a GLM or a gas-liquid mixing tank, and the fifth control switch is a float switch.

The liquid inlet end of the GLS 105 is connected to the liquid outlet end of the GLM 104 through a circulating pump 16, a liquid outlet end of the GLS 105 is divided into a first water channel and a second water channel, and the first water channel is connected to the GLM 104 for backflow. Therefore, after a mixed liquid flowing out from the circulating pump 16 is filtered by the GLS 105, the mixed liquid flows back to the GLM 104 before being output from a device, so as to adjust the concentration of NOIs in the water to achieve an optimal mixing effect. In addition, the above-mentioned NOI concentration sensor may be configured to cooperate in adjusting the concentration of NOIs in the water. The second water channel is a use water channel, which may be connected to an external spray head and the like. The working principle of the GLS 105 is that under a certain pressure, the GLS only allows gas to pass through and does not allow liquid to pass through. The GLS may be a cylinder, the water inlet end and the water outlet end are at the bottom of the cylinder, and the air outlet end is at the top of the cylinder. When the water pressure is not excessively high, exhaust gas escapes from the air outlet end at the top, and the water cannot reach the top of the cylinder. To prevent the water pressure from being excessively high and prevent water from overflowing from the top of the cylinder, it is possible to arrange a breathable film or an exhaust valve at the top of the cylinder. Certainly, the GLS 105 may alternatively be another GLS or exhaust gas recoverer.

The first water channel is provided with a first control switch. Therefore, the first water channel can be opened or closed through the first control switch for backflow. When the concentration of NOIs needs to be adjusted, the first control switch is turned on, and when a standard is reached, the first control switch is turned off. The first control switch may be a valve, such as a solenoid valve. In addition, it is also possible to join the first water channel with the rear half of the water inlet pipe of the GLM 104 to form a water channel in cross communication, and a solenoid valve with one or more selectively conducted ways may be selected as the corresponding first control switch.

The activated carbon filter 106 is configured to treat super oxygen discharged from the GLS 105 and the GLM 104; and the air inlet end of the activated carbon filter 106 is connected to the air outlet end of the GLS 105 and the air outlet end of the GLM 104. Therefore, the super oxygen discharged from the air outlet end of the GLS 105 and the air outlet end of the GLM 104 is treated to prevent the discharged super oxygen from being dissolved into the water again or directly discharged to cause harm to the human body. The activated carbon filter 106 may be an apparatus or device capable of adsorbing super oxygen, or may be replaced with a heating apparatus or device, and the heating temperature is controlled so that the super oxygen can be instantly decomposed into oxygen at the heating temperature. An outer part of the activated carbon filter 106 is a cylinder, and an inner part thereof is provided with activated carbon or a heating apparatus. The air outlet end is at the top of the cylinder, the air inlet end needs to pass through the activated carbon or the heating apparatus, and the water outlet end is at the bottom of the cylinder.

Figure 7:
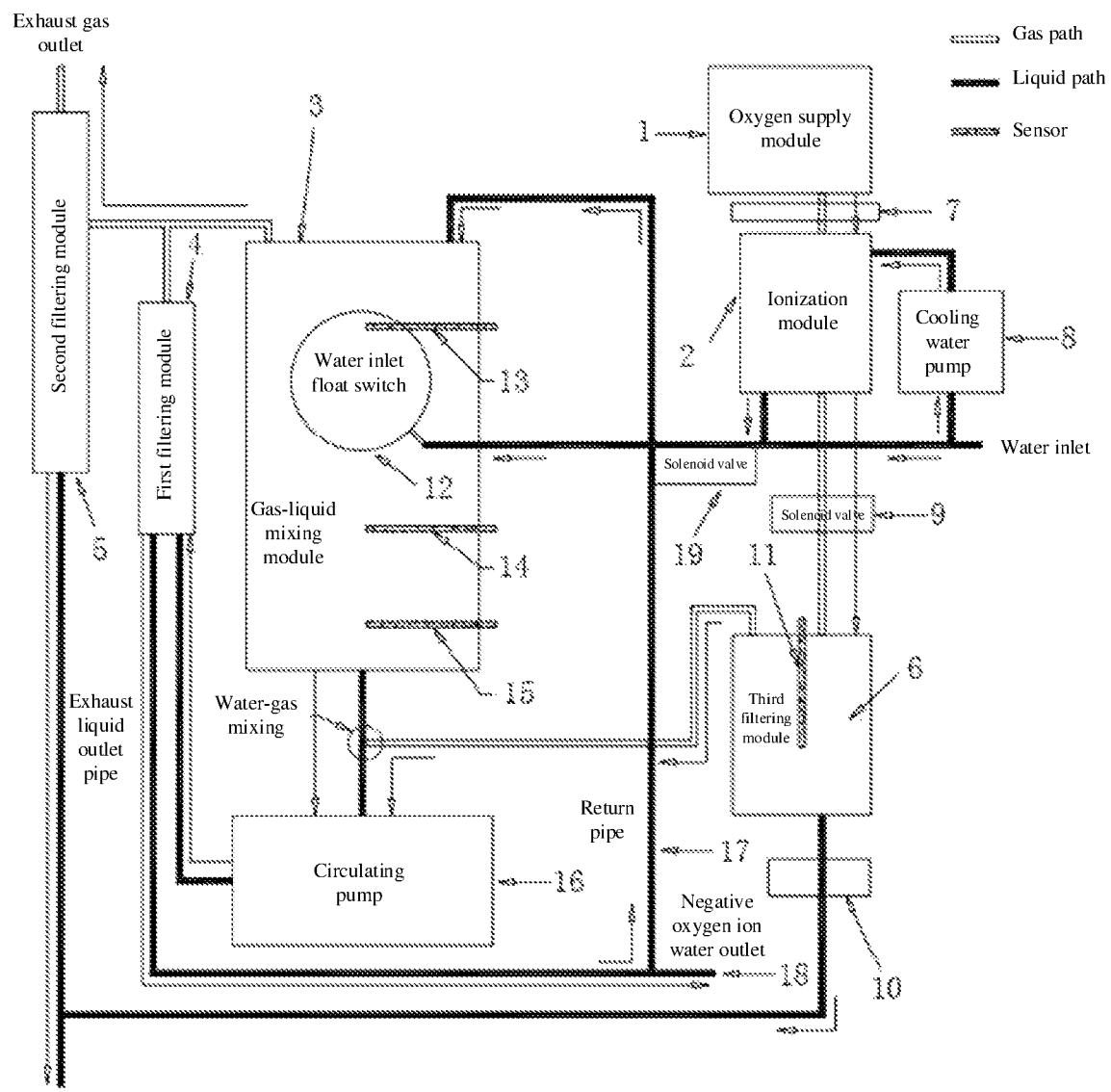
FIG. 7 is a schematic diagram of a connection structure of built-in modules of an NOI water bath apparatus according to an implementation of the present disclosure.

FIG. 7 schematically illustrates a schematic diagram of a connection structure of built-in modules of an NOI water bath apparatus according to an implementation of the present disclosure. As shown in FIG. 7, the built-in modules include an oxygen supply module 1, an ionization module 2, a cooling module, a gas-liquid mixing module 3, a first filtering module 4, a second filtering module 5 and a third filtering module 6.

An air inlet end of the ionization module 2 is connected to an air outlet end of the oxygen supply module 1 through a fourth control switch 7, and a barometer may be selectively installed inside the joint.

A water inlet end of the cooling module is connected to a front half of a water inlet pipe of the gas-liquid mixing module 3 through a cooling water pump 8, and a water outlet end of the cooling module is connected to a rear half of the water inlet pipe of the gas-liquid mixing module 3.

An air inlet end of the third filtering module 6 is connected to an air outlet end of the ionization module 2 through a second control switch 9, a waste material end of the third filtering module 6 is connected to a third control switch 10, and a first liquid level sensor 11 is further arranged in the third filtering module 6.

An air inlet end or a water outlet end of the gas-liquid mixing module 3 is connected to an air outlet end of the third filtering module 6 for gas-liquid mixing, and the gas-liquid mixing module 3 is connected to the water inlet pipe through a fifth control switch 12 at the water inlet end. A second liquid level sensor 13, an NOI concentration sensor 14 and a temperature sensor 15 are installed inside the gas-liquid mixing module 3.

A water inlet end of the first filtering module 4 is connected to a water outlet end of the gas-liquid mixing module 3 through a circulating pump 16, and a water outlet end of the first filtering module 4 is divided into two branches, a first water channel 17 and a second water channel 18. The first water channel 17 is connected to the gas-liquid mixing module 3 through a first control switch 19 to form backflow, the corresponding first water channel 17 may be connected to a rear half of the water inlet pipe of the gas-liquid mixing module 3 to form a water channel in cross communication, the corresponding first control switch 19 is a solenoid valve with one or more selectively conducted ways, and the second water channel may be connected to any switch apparatus in a bathroom.

An air inlet end of the second filtering module 5 is connected to an air outlet end of the gas-liquid mixing module 3 and an air outlet end of the first filtering module 4, an air outlet end of the second filtering module 5 is used for exhaust, and a liquid outlet end of the second filtering module 5 is connected to the waste material end of the third filtering module 6.

The above-mentioned structure is connected according to the above-mentioned connection relationship and then installed in a housing, and each controllable component is connected to an electrical controller to implement automatic control of the apparatus.

The human body's absorption of oxygen is limited by the bottleneck (a ventilator and a hyperbaric oxygen chamber) that alveoli convert oxygen to NOIs. An NOI generator on the market releases NOIs into the air, the concentration of NOIs obtained in this way generally does not exceed 109/cm3, and the NOIs can be absorbed by the human body through the breathing of the lungs only. Whether NOIs can play a role in the treatment of human diseases depends on the concentration of NOIs. Only when the concentration of NOIs exceeds a certain threshold can therapeutic effects be achieved. When the lungs absorb oxygen, the oxygen is delivered to various organs of the body through a blood circulation system and reaches a disease site. When the disease site is far away from the lungs, the concentration of NOIs delivered is likely to be lower than the threshold that can achieve the therapeutic effects, and thus the therapeutic effects are often not achieved.

When sweat glands secrete sweat, the sweat can be discharged out of the body through the skin. Similarly, when the human body is immersed in a liquid containing oxygen with a high concentration, oxygen can also enter the human body through the skin and be absorbed by the human body. Skins are near all organs of the body. Therefore, these organs can be supplemented by NOIs with a high concentration through the blood circulation system, and the concentration of NOIs more easily exceeds the threshold for achieving the therapeutic effects. Therefore, the NOI water bath apparatus according to the present disclosure provides a more effective way of oxygen therapy, and the concentration of generated NOIs in the water is as high as $1.5 \times 1020/cm3$.

Compared with the prior art, the NOI water bath apparatus according to the present disclosure dissolves NOIs with an ultra-high concentration in water through exhaust gas filtration and backflow, to create a liquid environment with high-concentration NOIs that are easily absorbed by skin, which is the largest organ of the human body, so that the oxygen that can be absorbed by the human body is many orders of magnitude higher than that absorbed using other methods. The method is a good oxygen supplement method.

The above are only some implementations of the present disclosure. A person of ordinary skill in the art may further make several modifications and improvements without departing from the idea of the present disclosure. These modifications and improvements shall fall within the protection scope of the present disclosure.

The invention claimed is:

1. A negative oxygen ion (NOI) water bath apparatus, comprising:
    an NOI generator, wherein the NOI generator comprises an ionization module, and the ionization module is configured to ionize oxygen into NOIs;
    a gas-liquid mixer (GLM), wherein an air inlet end of the GLM is connected to an air outlet end of the NOI generator, the GLM comprises a gas-liquid mixing module, and the gas-liquid mixing module is configured to dissolve the NOIs generated by the ionization module; and
    a gas-liquid separator (GLS), wherein a liquid inlet end of the GLS is connected to a liquid outlet end of the GLM, the GLS comprises a first filtering module, and the first filtering module is configured to filter out exhaust gas in the gas-liquid mixing module.

2. The NOI water bath apparatus according to claim 1, wherein the liquid inlet end of the GLS is connected to the liquid outlet end of the GLM through a circulating pump, a liquid outlet end of the GLS is divided into a first water channel and a second water channel, and the first water channel is connected to the GLM for backflow.

3. The NOI water bath apparatus according to claim 2, wherein the first water channel is provided with a first control switch.

4. The NOI water bath apparatus according to claim 1, further comprising an activated carbon filter, wherein an air inlet end of the activated carbon filter is connected to an air outlet end of the GLS and an air outlet end of the GLM; and
    the activated carbon filter comprises a second filtering module, and the second filtering module is configured to treat super oxygen discharged from the air outlet end of the GLS and the air outlet end of the GLM.

5. The NOI water bath apparatus according to claim 1, further comprising a filter, wherein an air inlet end of the filter is connected to the NOI generator, and an air outlet end of the filter is connected to the air inlet end of the GLM; and
    the filter comprises a third filtering module, and the third filtering module is configured to filter out impurities formed by oxidation by oxygen ions.

6. The NOI water bath apparatus according to claim 5, wherein the air inlet end of the filter is connected to the air outlet end of the NOI generator through a second control switch, a waste material end of the filter is connected to a third control switch, and a first liquid level sensor is arranged in the filter.

7. The NOI water bath apparatus according to claim 1, further comprising a cooling water apparatus, wherein the cooling water apparatus is arranged inside or outside the NOI generator; the cooling water apparatus comprises a cooling module, and the cooling module is configured to cool the NOI generator.

8. The NOI water bath apparatus according to claim 7, wherein a water inlet end of the cooling water apparatus is connected to a front half of a water inlet pipe of the GLM through a cooling water pump, and a water outlet end of the cooling water apparatus is connected to a rear half of the water inlet pipe of the GLM.

9. The NOI water bath apparatus according to claim 1, further comprising an oxygen purification apparatus, wherein an air outlet end of the oxygen purification apparatus is connected to the NOI generator through a fourth control switch; and the air outlet end of the oxygen purification apparatus is provided with a barometer; and the oxygen purification apparatus comprises an oxygen supply module, and the oxygen supply module is configured to purify oxygen.

10. The NOI water bath apparatus according to claim 1, wherein a water inlet end of the GLM is connected to a water inlet pipe through a fifth control switch, and at least one of a second liquid level sensor, an NOI concentration sensor and a temperature sensor is arranged in the GLM.

\* \* \* \* \*